(12) United States Patent
Davia et al.

(10) Patent No.: US 6,865,731 B2
(45) Date of Patent: Mar. 8, 2005

(54) METHOD AND COMPUTER PROGRAM PRODUCT FOR TESTING APPLICATION PROGRAM SOFTWARE

(75) Inventors: Christopher Jay Davia, Mableton, GA (US); Bradley Kenneth Wells, Kennesaw, GA (US)

(73) Assignee: International Business Machines Corporation, Armonk, NY (US)

(*) Notice: Subject to any disclaimer, the term of this patent is extended or adjusted under 35 U.S.C. 154(b) by 407 days.

(21) Appl. No.: 09/867,883

(22) Filed: May 30, 2001

(65) Prior Publication Data

US 2002/0184614 A1 Dec. 5, 2002

(51) Int. Cl.$^7$ .................................................. G06F 9/44
(52) U.S. Cl. ................ 717/127; 717/125; 717/126; 717/131
(58) Field of Search ................ 717/124–131; 712/227, 244; 714/25, 37–57; 710/66–68

(56) References Cited

U.S. PATENT DOCUMENTS

| | | | |
|---|---|---|---|
| 5,453,992 A | | 9/1995 | Whetsel ..................... 371/22.3 |
| 5,596,733 A | * | 1/1997 | Worley et al. .............. 712/244 |
| 5,742,754 A | | 4/1998 | Tse ........................ 395/183.14 |
| 5,996,016 A | | 11/1999 | Thalheimer et al. ........ 709/227 |

OTHER PUBLICATIONS

BEA, "BEA MessageQ—Programming Guide", Document Edition 5.0, http://e–docs.bea.com/tuxedo/msgq/index.htm, Chapter 2 and Chapter 7, pp. 2.1–2.28, 7.1–7.26, 3–2000.*
Andrews et al., "Broad–Spectrum Studies of Log File Analysis", ACM, pp.: 105–114, 2000.*

* cited by examiner

*Primary Examiner*—Tuan Dam
*Assistant Examiner*—Ted T. Vo
(74) *Attorney, Agent, or Firm*—Duke W. Yee; John R. Pivnichny; Francis Lammes

(57) ABSTRACT

A test bed includes a primary test computer and a number of secondary test computers. The primary test computer includes a primary test program, and the secondary test computers each include secondary test programs. As a technician tests the application program, the primary test program captures and logs input data, and sends the input data to a secondary test computer. The secondary test computer maps the input data according to the format required by its associated secondary test computer. The secondary test computer executes the application program according to the mapped input data. When the secondary test computer detects an exception condition arising from a bug or other unusual behavior of the application program, the secondary test computer notifies the primary test computer. The primary test computer displays and logs the exception condition.

16 Claims, 2 Drawing Sheets

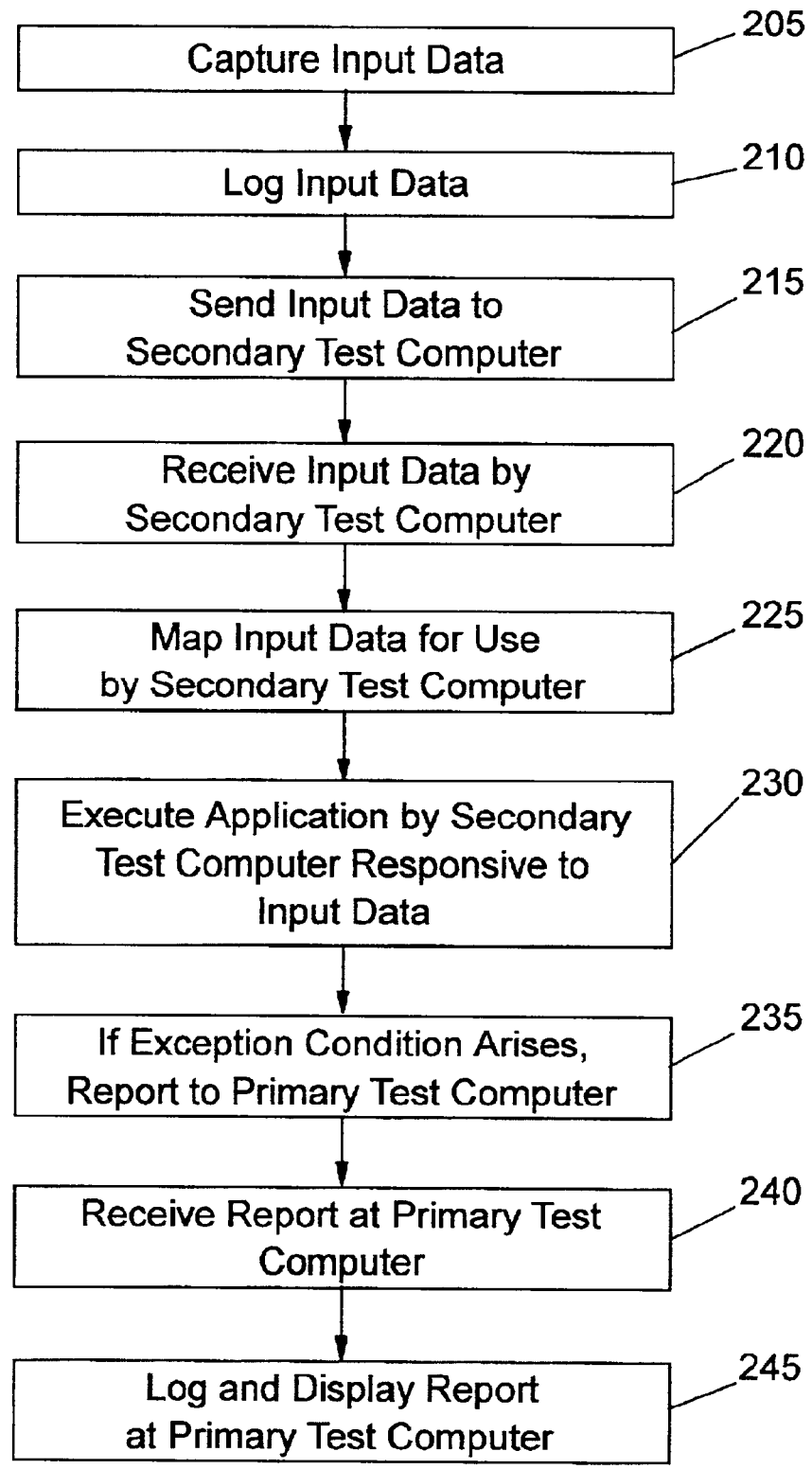

METHOD AND COMPUTER PROGRAM PRODUCT FOR TESTING APPLICATION PROGRAM SOFTWARE

FIELD OF THE INVENTION

The invention applies generally to the field of testing application program software, and more particularly to testing an application program that is executing on a primary test computer and also on one or more secondary test computers that may be remote from the primary test computer, where the secondary test computers may differ from the primary test computer in their processors, operating systems, and configurations.

BACKGROUND

At various stages of the software development cycle, an application program may selectively exhibit bugs and other unusual behaviors. As a consequence, properly testing an emerging application program involves executing the program on a number of different test computers that employ a variety of different processors, operating systems, drivers, configurations, and so forth. Because of the essential dissimilarity and incompatibility of the various test computers, a technician must conduct a manual test for each processor, each operating system, each driver, and so forth, of interest. As a result, properly testing a software application program is costly and time consuming.

Basic test tools are available to help technicians who do software testing. A typical test generation program might allow the technician to interact with the application program in order to create a test script. Effectively, the test script mimics the technician.

The test script captures data input by the technician, for example the technician's keyboard entries and mouse movements, and records the resulting dialog boxes, pop-up windows, and application windows that appear as the test computer executes the application program. Once a test script is created, it may be used to re-create a particular test, or to test the application program on a second computer that has the same characteristics as the test computer used in generating the script. Dialog boxes, pop-up windows, and application windows forthcoming as the application program executes on the second computer are then compared with their counterparts recorded in the test script. Any differences observed in the comparison are recorded in a log book. Thus, the test technician can use the test script to test an application program as it evolves during development, provided that the computer used by the technician has the same processor, operating system, and so forth, as the test computer used to generate the test script.

Although these tools are a great help when testing application program software, such test tools are, unfortunately, quite inflexible. Each test script is static—whenever a dialog box, pop-up window, or application window changes during the development process, the test script must be edited or re-written. Moreover, this inflexibility shows itself when an application program is required to work properly across a spectrum of operating systems, for example when testing an Internet application program that runs in a web browser. Not only must a set of test scripts be written, one for each operating system of interest, but also a version of the program that executes the test script must be written for each operating system of interest. Further, the proper version of the program that executes the test script must be installed on each test computer, and the tests actually run.

Upon the completion of each test run, the technician must manually access and examine log books that record the results of the test. Only then may the technician learn of bugs or other unusual behavior of the application program. Because test results are available only when logbooks are examined upon completion of the test, the technician does not receive any immediate feedback, and is therefore unable to tailor the test during its run, in response to any unusual behavior shown by the application program. Moreover, even if immediate feedback were provided, the technician would be unable to tailor the test, as the test scripts are static.

Thus, in view of the aforementioned limitations of today's test tools, there is a need for a way of testing a software application program that is efficient across a number of different processors, operating systems, drivers, configurations, and so forth, and which provides run-time flexibility and immediate feedback to a test technician so that the technician may explore related matters when the application program exhibits undesirable or unusual behavior.

SUMMARY

The present invention provides a way of testing application programs efficiently and effectively across a variety of operating systems, processors, and configurations. A test bed according to the present invention includes a primary test computer, which may be operated by a technician, and a number of secondary test computers, which also execute the application program under test. The processors, operating systems, configurations, and so forth of the various secondary test computers may differ among each other and may differ from the processor, operating system, or configuration of the primary test computer.

The primary test computer includes a primary test program, and each of the secondary test computers includes a secondary test program. As the technician manipulates the application program under test, the primary test program captures input data such as the technician's keyboard entries and mouse actions. The input data is logged by the primary test program. The primary test computer sends the captured input data to each of the secondary test computers, where the secondary test programs map the input data according to the formats required by their associated secondary test computers. The secondary test computers execute the application program according to the mapped input data. When a secondary test computer detects an exception condition arising from a bug or other unusual behavior of the application program, the secondary test computer notifies the primary test computer. The primary test computer displays the exception to the test technician, and logs the exception condition for future reference.

In one embodiment of the present invention, a secondary test computer may be remote from the primary test computer. In this embodiment, the primary test computer may communicate with the secondary test computer over the Internet. In another embodiment of the invention, the primary test computer may communicate with a secondary test computer over an Intranet, using communication formats and protocols suitable for the Internet, such as TCP/IP, or a subset of these formats and protocols. In yet another embodiment of the invention, the primary test computer and the secondary test computer may be local to each other, and communicate by direct attachment, for example through serial or parallel ports.

Thus, the present invention provides a flexible and economic way of testing a software application program across a wide variety of processors, operating systems, and configurations, without requiring a separate test script for each configuration. Moreover, the present invention provides the benefit of immediate feedback of test results to the test technician. This feedback enables the technician to alter the course of a test, in response to unusual behavior exhibited by the application program, as it executes on the secondary test computers. These and other aspects of the invention will be more fully appreciated when considered in the light of the following detailed description and drawings.

BRIEF DESCRIPTION OF THE DRAWINGS

FIG. 2 shows aspects of the operation of the primary test computer and the secondary test computer of FIG. 1, according to the present invention.

DETAILED DESCRIPTION

Figure 1:
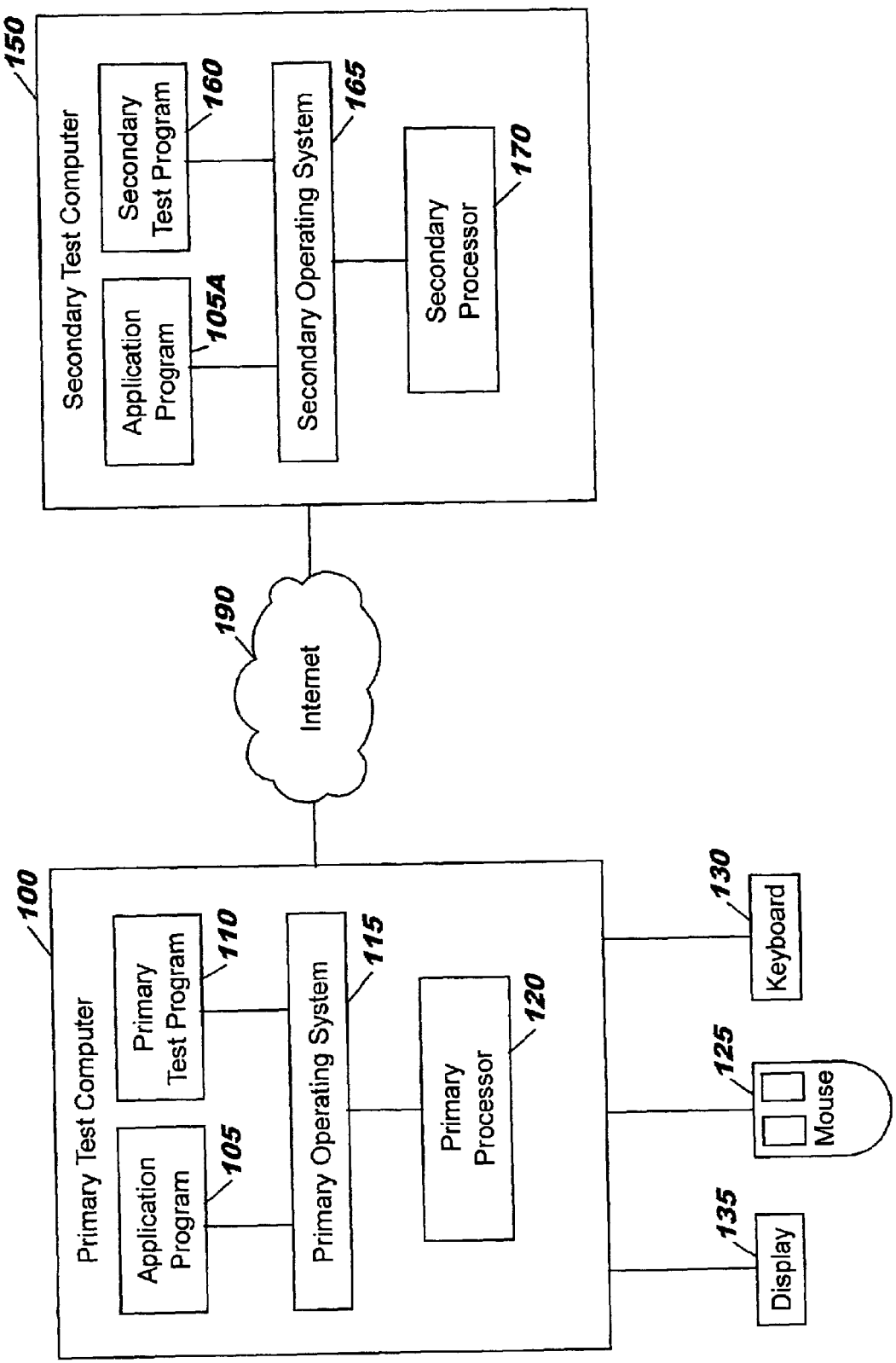
FIG. 1 shows a primary test computer and a secondary test computer interconnected by the Internet.

The present invention provides an improved way of testing application programs across a variety of test computers that may have different operating systems, different processors, and different configurations.

As shown in FIG. 1, a primary test computer 100 includes an application program 105 that is under test, a primary test program 110, a primary operating system 115, a computer mouse 125, a keyboard 130, a visual display 135, and a primary processor 120 which controls the operation and execution of the aforementioned elements of the primary test computer 100. The primary test computer 100 operates in cooperation with a secondary test computer 150, which also tests the application program. Although FIG. 1 shows only one secondary test computer 150, the invention applies as well to a plurality of secondary test computers.

The secondary test computer 150 includes an application program 105A under test, a secondary test program 160, a secondary operating system 165, and a secondary processor 170 which controls the operation and execution of the aforementioned elements of the secondary test computer 150.

Although the application program 105 under test by the primary test computer 100 and the application program 105A under test by the secondary test computer 150 are substantially the same application program, there may be some technical differences between the two application programs 105 and 105A that result from differences in the interfaces provided by the primary operating system 115 and the secondary operating system 165. The present invention may be most advantageous when the primary operating system 115 and the secondary operating system 165 are different operating systems, or when the primary processor 120 and the secondary processor 170 have different architectures; nevertheless, such differences are not necessary conditions of the invention.

In one embodiment of the invention, the primary test computer 100 and the secondary test computer 150 are connected by the Internet 190, as shown in FIG. 1. In this embodiment, the primary test computer 100 and the secondary test computer 150 each have unique TCP/IP network addresses. In another embodiment of the invention, the primary test computer 100 and the secondary test computer 150 are connected by an Intranet, which may be a private network that operates using Internet formats and protocols. In another embodiment of the invention, the primary test computer 100 and the secondary test computer 150 are connected directly, for example through their serial or parallel ports.

In order that the primary test program 110 and the secondary test program 160 may readily accommodate a wide variety of operating systems, the primary test program 110 and the secondary test program 160 may be Java applications. The primary test program 110 may be configured by an initialization file that contains a list of TCP/IP addresses and TCP/IP socket ports for each secondary test computer 150 of a test bed, and each secondary test program 160 may be configured by an initialization file that contains an appropriate TCP/IP socket port for communication with the primary test computer 100.

To test the application programs 105 and 105A, a technician enters input data, for example by operating the mouse 125 or the keyboard 130 of the primary test computer 100. Input data may include Mouse Click (x, y, targetObj), Mouse Double Click (x, y, targetObj), Right Mouse Click (x, y, targetObj), Right Mouse Double Click (x, y, targetObj), Keyboard Press (keys), Mouse Drag (x, y, sourceObj), Mouse Drop (x, y, targetObj), and so forth.

The primary operating system 115 passes the input data to the primary test program 110 and to the application program 105 under test by the primary test computer 100, which executes accordingly. As shown in FIG. 2, the primary test program 110 captures the input data (step 205), and logs the input data (step 210). The log may be kept in memory of the primary test program 110, or in other memory of the primary test computer 100, for example in a hard drive (not shown), or in memory external to the primary test computer 100, for example in an external database (not shown).

The input data is sent to the secondary test computer 150 (step 215). As indicated earlier, the input data may be sent to the secondary test computer 150 over the Internet 190, or over an Intranet, which may use a subset of the formats and protocols appropriate for Internet communication, or directly, for example by serial port or parallel port interconnection.

The secondary test computer 150 receives the input data sent by the primary test computer 100 (step 220). The secondary test program 160 of the secondary test computer 150 maps the input data received from the primary test computer 150 according to the conventions of the secondary operating system 165 and the I/O bus of the secondary test computer 150, to provide mapped input data.

Input mapping may be performed by converting pixel coordinates of the primary test computer 100 to the pixel coordinates of secondary test computer 150. The primary test computer 100 may furnish its screen resolution to the secondary test computer 150. The secondary test computer 150 may then determine its own screen resolution and determine an adjustment factor. This adjustment factor may be applied to every type of input data that has associated coordinates. For example, if the primary test computer 100 has a screen resolution of 1024 by 678, and the secondary test computer 150 has a screen resolution of 800 by 600, the secondary test computer 150 would calculate an adjustment factor of 1.28. Each coordinate of the input data from the primary test computer 100 would be divided by 1.28 in order to be positioned at the proper location.

The application program 105A of the secondary test computer 150 executes according to the mapped input data (step 230). As the application program 105A executes on the secondary test computer 150, an exception condition may occur. For example, an exception condition may be a fatal error, an invalid input, an incomplete input, and so forth. The secondary test program 160 of the secondary test computer 150 reports the exception condition to the primary test program 110 of the primary test computer 100 (step 235). The primary test computer 100 receives the report sent by the secondary test computer 150 (step 240). The primary test program 110 of the primary test computer 100 logs the report and displays the exception condition on the visual display 135 (step 245).

From the foregoing description, those skilled in the art will recognize that the present invention provides a convenient, flexible, and efficient way of testing application program software across a range of operating systems, processors, and configurations. The foregoing description is illustrative rather than limiting, however, and the scope of the present invention is limited only by the following claims.

We claim:

1. A method for testing an application program, comprising the steps of:
   capturing input data entered into a primary test computer testing an application program;
   sending the input data from the primary test computer to a secondary test computer also testing the application program;
   receiving the input data by the secondary test computer;
   executing the application program by the secondary test computer responsive to the input data;
   when an exception condition occurs while executing the application program by the secondary computer, reporting the exception condition to the primary test computer immediately upon detection of the exception condition; and
   displaying the exception condition by the primary test computer.

2. The method of claim 1, further comprising the step of logging the input data by the primary test computer.

3. The method of claim 1, further comprising the step of mapping the input data to a format compatible with the secondary test computer, wherein the step of mapping is performed by the secondary test computer.

4. The method of claim 1, further comprising the step of logging the exception condition, wherein the step of logging is performed by the primary test computer.

5. The method of claim 1, wherein the input data is entered using a keyboard.

6. The method of claim 1, wherein the input data is entered using a computer mouse.

7. The method of claim 1, wherein the primary test computer sends the input data to the secondary test computer over the Internet, and the secondary test computer reports the exception condition to the primary test computer over the Internet.

8. The method of claim 1, wherein the primary test computer sends the input data to the secondary test computer over an Intranet, and the secondary test computer reports the exception condition to the primary test computer over the Intranet.

9. The method of claim 1, wherein the primary test computer sends the input data to the secondary test computer using TCP/IP communication protocol, and the secondary test computer reports the exception condition to the primary test computer using TCP/IP communication protocol.

10. Programmable media containing programmable software for a primary test program that tests an application program, the programmable media containing programmable software comprising the steps of:
    capturing input data entered into a primary test computer testing an application program;
    sending the input data from the primary test computer to a secondary test computer also testing the application program; and
    receiving a report sent immediately upon detection of an exception condition to the primary test computer by the secondary test computer of the exception condition that occurs during execution of the application program by the secondary test computer responsive to the input data.

11. The programmable media containing programmable software of claim 10, further comprising the step of displaying the exception condition by the primary test computer.

12. The programmable media containing programmable software of claim 10, wherein the step of sending the input data to a secondary test computer includes the step of transmitting the input data from the primary test computer to the secondary test computer over the Internet.

13. The programmable media containing programmable software of claim 10, wherein the step of sending the input data to a secondary test computer includes the step of transmitting the input data from the primary test computer to the secondary test computer over an Intranet.

14. Programmable media containing programmable software for a secondary test program that tests an application program, the programmable media containing programmable software comprising the steps of:
    receiving input data sent by a primary test computer testing an application program, wherein the step of receiving is performed by a secondary test computer also testing the application program;
    mapping the input data to a form compatible with the secondary test computer, thereby providing mapped input data, wherein the step of mapping is performed by the secondary test computer; and
    when an exception condition occurs while executing the application program by the secondary test computer responsive to the mapped input data, reporting the exception condition to the primary test computer immediately upon detection of the exception condition.

15. The programmable media containing programmable software of claim 14, wherein the step of reporting the exception condition includes the step of transmitting the exception condition from the secondary test computer to the primary test computer over the Internet.

16. The programmable media containing programmable software of claim 14, wherein the step of reporting the exception condition includes the step of transmitting the exception condition from the secondary test computer to the primary test computer over an Intranet.

* * * * *